(No Model.)

E. SAUSER & M. HALLER.
DEVICE FOR COOLING BEER.

No. 289,717. Patented Dec. 4, 1883.

Attest
Joseph W. Sims
Chas. Anderson

Inventors
Elias Sauser
Martin Haller
By John W. Hill
Atty

UNITED STATES PATENT OFFICE.

ELIAS SAUSER AND MARTIN HALLER, OF CINCINNATI, OHIO.

DEVICE FOR COOLING BEER.

SPECIFICATION forming part of Letters Patent No. 289,717, dated December 4, 1883.

Application filed June 15, 1883. (No model.)

*To all whom it may concern:*

Be it known that we, ELIAS SAUSER and MARTIN HALLER, of Cincinnati, in the county of Hamilton and State of Ohio, have invented certain new and useful Improvements in Devices for Cooling Beer, of which the following is a specification.

Our invention relates to apparatus for cooling beer and similar substances in fermenting and cooling tuns; and it consists of a cooler, of copper or other suitable material, which is placed in the center of the tun or other cooling-vessel, and connected by means of properly-arranged inlet and outlet pipes (which are provided with union-joints and stop-valves) with the "direct" and "return" mains, which convey the cooling-fluid from the circulating-pump and to the refrigerating-tank, respectively, and a circulating-pump, which is connected upon the suction side thereof with the refrigerating-tank of an ice-machine, and upon the discharge side with the direct main, which conveys the cooling-fluid to the above-mentioned copper cooler. The cooler (of which any desired number may be used) is attached to the direct and return mains in such a manner that it may be connected or disconnected quickly and easily, and, according to the requirements, may be caused to pass more or less of the cooling-fluid through it. The direct and return mains are arranged to make a complete circuit around the system of cooling-tuns, and, in conjunction with the circulating-pump, to maintain any desired rate of supply of the cooling-fluid to the several coolers above mentioned. The cooling-fluid is salt brine, the temperature of which is reduced by refrigeration in the cooling-tank of any of the well-known ice or refrigerating machines, and which is drawn from the refrigerating-tank, pumped through the coolers, and returned to the refrigerating-tank at an elevated temperature by the circulating-pump and direct and return mains referred to.

Figure 1:
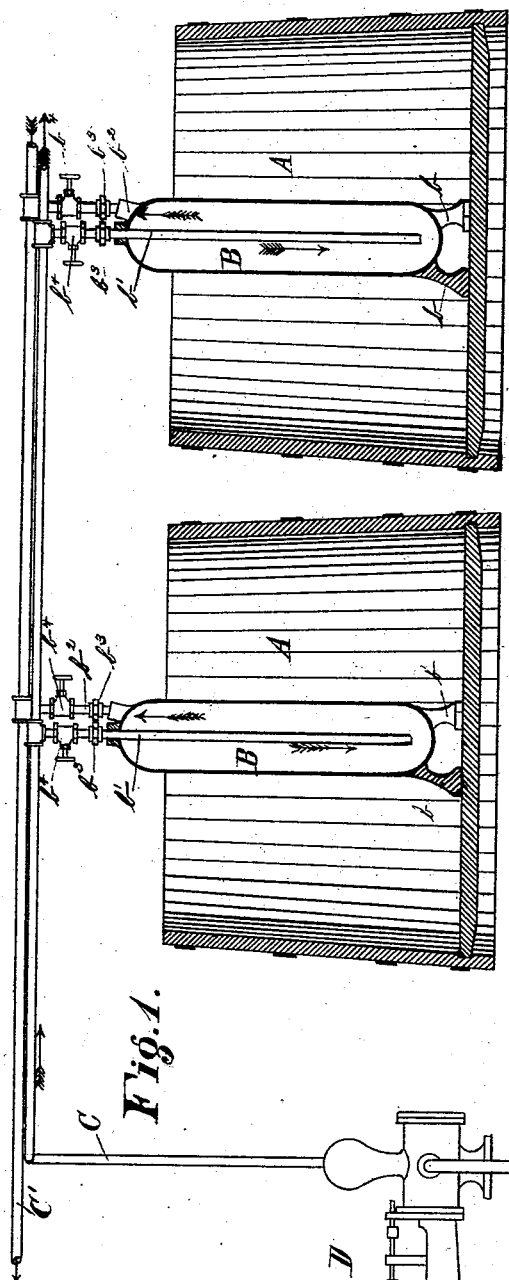
Figure 2:
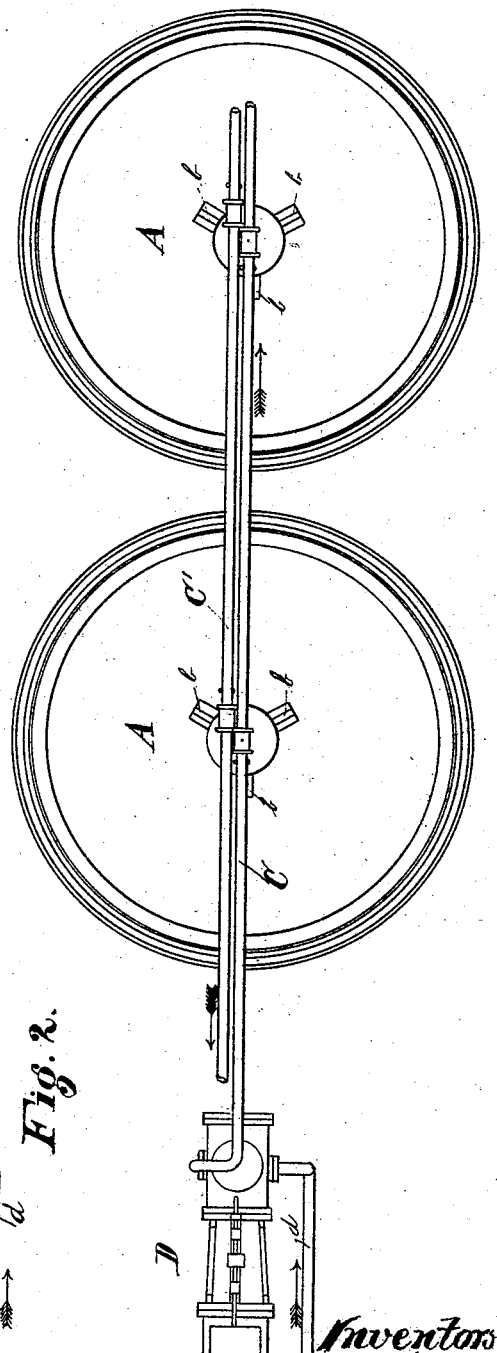

In the accompanying drawings, Figure 1 is a view, partly in elevation and partly in section, of our improved cooling apparatus; and Fig. 2 is a plan view of the parts shown in Fig. 1.

Similar letters of reference indicate similar parts.

A A are the usual fermenting or cooling tuns, (as the case may be,) placed side by side in rows or circuits in the cooling-rooms of a brewery or similar establishment, and which are charged with the beer or other substance to be cooled.

B B are the copper coolers, which are cylindrical in form, with hemispherical ends, in order with comparatively thin material to secure great strength as against the pressure of the salt brine, which usually flows through the mains at a pressure per square inch of fourteen or fifteen pounds.

$b\ b$ are feet, upon which the cooler B is mounted sufficiently above the floor of the tun to expose the entire bottom thereof to contact with the beer.

$b'$ are inlet-pipes, and $b^2$ outlet-pipes, the former of which are connected with the direct main C, and the latter with return main C'.

$b^3$ are union-joints, and $b^4$ stop-valves, by means of which the flow of salt brine through the cooler B may be suppressed and the cooler disconnected or connected at will, and the supply of salt brine to the cooler be regulated to meet the requirements of the beer or other substance in the tun.

D is a circulating-pump, of any approved form, the suction-pipe $d$ of which is connected with the salt brine in the refrigerating-tank of the ice or refrigerating machine now in general use in breweries.

The operation of the apparatus is as follows: The refrigerated salt brine flows through the suction-pipe $d$ to the pump D, through the direct main C to the inlet-pipe $b'$ of cooler B, through the cooler, where the salt brine at its reduced temperature absorbs the heat in the beer in the tun, through the outlet-pipe $b^2$ from cooler B, and finally through the return main C', back again to the refrigerating-tank, where the temperature of the brine is again reduced and drawn through suction-pipe $d$ to make the above-described circuit indefinitely. The arrows show the direction of flow of the salt brine.

With our improved cooling apparatus a tun of beer can be cooled in fourteen to fifteen days, while with the "swimmers" or coolers previously in use from twenty-one to twenty-four days are required to accomplish the same work; besides, our improved apparatus avoids the cost of ice and labor necessary with the customary swimmers, and permits of a greater number of tuns in a given floor-space, no space between tuns being necessary for the workman to pass around, as with the old-fashioned swimmers.

It is obvious that any desired number of coolers may be connected in the system by providing the usual fittings for attachment to direct and return pipes C and C'.

By means of the union-joints $b^3$ the coolers may be disconnected at will and lifted out of the tuns for cleansing or transfer to other tuns, the stop-valves $b^4$ being first closed to maintain the circulation of salt brine to the remaining coolers.

We are aware that an annular cooler such as is described in the patent to A. Zoller, of July 4, 1882, is not new; but such a cooler to be capable of safely resisting the pressure on pipes C and C' must be of comparatively thick copper, and would be correspondingly slow in absorbing the heat of the beer.

We are also aware that it is not new to employ pipes extending down into a tank and connecting at opposite ends with a main supply and a main discharge circulating-pipe, the construction being such as shown and described in the patents of I. Schafhaus, March 15, 1881; Mayer and Jungenfiel, September 26, 1882; H. Kropff, November 28, 1882, and J. W. Schorr, March 27, 1883.

We are likewise aware of the use of apparatus somewhat similar to cooler B for other purposes, and that our invention is necessarily limited to the construction and arrangement of devices substantially as described.

Having described our invention, what we claim is—

The combination of the direct and return mains C C', the cooler B, of cylindrical form, with hemispherical ends, and having means to support it in an upright position on the bottom of a tun, a tube, $b'$, leading from the main C and depending vertically into the cooler, with its lower open end terminated adjacent to the bottom thereof, the outlet-tube $b^2$, leading from the main C' to the cooler, with its lower open end terminated adjacent to the upper portion thereof, union-joints $b^3$, and stop-valves $b^4$ in the inlet and outlet pipes, respectively, substantially as and for the purpose described.

In testimony whereof we have signed our names to the foregoing specification in the presence of two subscribing witnesses.

ELIAS SAUSER.
MARTIN HALLER.

Witnesses:
JOHN W. HILL,
JOSEPH W. SIMS.